United States Patent [19]

O'Connor

[11] E Patent Number: Re. 32,608

[45] Reissued Date of Patent: Feb. 23, 1988

[54] WINDING A PACKAGE OF TAPE

[75] Inventor: Lawrence O'Connor, Winnipeg, Canada

[73] Assignee: KT Technologies Inc., Bridgetown, Barbados

[21] Appl. No.: 913,719

[22] Filed: Sep. 30, 1986

Related U.S. Patent Documents

Reissue of:

[64] Patent No.: 4,477,035
Issued: Oct. 16, 1984
Appl. No.: 462,558
Filed: Jan. 31, 1983

[30] Foreign Application Priority Data

Feb. 4, 1982 [GB] United Kingdom ..... 8203185

[51] Int. Cl.[4] ..... B65H 18/16; B65H 54/28

[52] U.S. Cl. ..... 242/67.1 R; 242/158 R; 242/DIG. 2; 242/65

[58] Field of Search ..... 242/1, 67.1 R, 55, 60, 242/158 R, 158 B, 158.2, 159, 167, 174, DIG. 2, 65

[56] References Cited

U.S. PATENT DOCUMENTS

| | | | |
|---|---|---|---|
| 784,794 | 3/1905 | Kimball | 242/159 X |
| 1,468,994 | 9/1923 | Cook | 242/167 |
| 1,639,676 | 8/1927 | Thronsen . | |
| 1,652,050 | 12/1927 | Robins . | |
| 2,372,400 | 3/1945 | Smith . | |
| 2,513,815 | 7/1950 | Nelson et al. . | |
| 2,554,855 | 5/1951 | Creed . | |
| 3,025,015 | 3/1962 | Mix | 242/68.5 |
| 3,044,614 | 7/1962 | Hanscom . | |
| 3,307,247 | 3/1967 | Parker . | |
| 3,467,931 | 9/1969 | Dutton . | |
| 3,598,337 | 8/1971 | Mackie . | |
| 3,833,184 | 9/1974 | Hara et al. | 242/158 R |
| 3,836,090 | 9/1974 | Mix | 242/68.5 |
| 3,963,186 | 6/1976 | Van den Aa | 242/158 R X |
| 3,979,084 | 9/1976 | Ruhl et al. . | |
| 3,997,122 | 12/1976 | Helfand et al. . | |
| 4,086,472 | 4/1978 | Sikora | 242/158 R |
| 4,411,396 | 10/1983 | Kytir | 242/158 R |

FOREIGN PATENT DOCUMENTS

| | | |
|---|---|---|
| 550697 | 7/1929 | Fed. Rep. of Germany . |
| 560457 | 10/1930 | Fed. Rep. of Germany . |
| 1215349 | 11/1959 | France . |
| 1368354 | 6/1964 | France . |
| 1489082 | 6/1967 | France . |
| 1064062 | 4/1967 | United Kingdom . |
| 1595664 | 8/1981 | United Kingdom . |

*Primary Examiner*—John M. Jillions
*Attorney, Agent, or Firm*—Adrian D. Battison; Stanley G. Ade; Murray Thrift

[57] ABSTRACT

Tape is wound into a package by traversing the winding position along a cylindrical core such that the winding position is intermittently and repeatedly halted at a plurality of positions arranged axially of the core so that at each position the tape is wound spirally following which the winding position is traversed to the next adjacent position. The spirals comprise at least one turn and more of the winding time is spent in forming spirals than in traversing between spirals. The spacing between the positions is such that the spirals do not overlap and such that the gap between the spirals is less than the width of the tape. The number of spirals wound at each position is insufficient to cause a step which interferes with traverse back to the position. Control of the traverse movement can be achieved either electronically by a pulse counter connected to the package support shaft or electro-magnetically by a control drum driven from the package support shaft.

30 Claims, 3 Drawing Figures

WINDING A PACKAGE OF TAPE

Matter enclosed in heavy brackets [ ] appears in the original patent but forms no part of this reissue specification; matter printed in italics indicates the additions made by reissue.

BACKGROUND OF THE INVENTION

This invention relates to a method and apparatus for winding tape onto a cylindrical core to form a package of the tape and to a package of tape when built by the method.

Plastic tape for use in the manufacture of electrical cable and similar such uses has been manufactured for many years generally by slitting a wide band of the material into a number of separate tapes which are usually single ply and vary in commonly used width between ¼" and ½" and in thickness between 5/10,000 TH of an inch and 20/10,000 TH of an inch. Tapes of this kind are slippery and difficult to handle in winding.

For many years tapes were wound onto a single spiral where one layer lies directly on top of the previous layer, and most wrapping machines from which the package of tape is used were built to accommodate only such single spiral tapes. In more recent years as automation and reduction of labour costs has become more important attempts have been made to form larger packages so as to reduce the labour content necessary to replace an empty package with a new full package on the wrapping machine.

In order to increase the amount of material in a package it is necessary to traverse the winding position axially of the cylindrical core on which the package is formed to form an elongate package much longer than the width of the material to be wound. In winding generally it is known to form either what is known as a parallel build package in which the material is laid helically with a small helix angle so that each turn of the material abutts the previous turn of material. It is also known to build what is known as cross wound packages where the helix angle is much greater than that required to traverse the winding position in the parallel build arrangement whereby the layers of material wound onto the package cross each other at an angle of the order of 20°. Cross wound packages of tape have been manufactured successfully and have been sold for use with wrapping machines and other circumstances but because of the slippery character of the tape involved they have been prone to telescoping and collapse of the shoulders of the package. This has been a serious problem in the industry and has limited the size of packages particularly in relation to their diameter thus increasing the labour necessary to replace empty packages on the subsequent machines.

It is one object of the invention therefore to provide a method and apparatus for forming a novel structure of package from such tape, which package is more resistant to telescoping and collapse than previous packages.

The invention therefore provides according to a first aspect thereof a method of building a package of tape wound on a core comprising forwarding the tape from a supply thereof, guiding the tape to a winding position on the core, rotating the core to wrap the tape around the core and traversing the winding position across the core to form a package, characterized in that the winding position is intermittently traversed to visit repeatedly during the package build each in turn of a plurality of separate positions arranged axially of the core, and at each position is maintained stationary for a period of time to wrap tape spirally of the core.

According to a second aspect the invention provides an apparatus for building a package of tape wound on a core, comprising support means for the core, drive means for rotating the core to wrap tape therearound, guide means for guiding the tape on to the core at a winding position, and traverse means for reciprocating one of the guide means and support means relative to the other to traverse the winding position axially of the core to build a package, characterized in that there are provided traverse control means including means arranged to intermittently advance the traverse means such that the winding position visits each of a plurality of separate positions arranged axially of the core in turn repeatedly during the package build and means for halting the traverse means for a period of time such that the winding position remains at each said position in turn to wrap tape spirally of the core at the position.

According to a third aspect of the invention there is provided a package of tape when built by a method as defined above.

The invention therefore has the advantage that the package is formed substantially from a plurality of spirals arranged at the separate positions axially of the core with the spirals interconnected every few turns by a helical portion traversing from one spiral to the next. This forms a package which is more rigid in structure than previous packages and particularly the ends or shoulders of the package are formed mainly from a spiral and thus are stronger and more resistant to telescoping than conventional cross wound packages.

The positions are preferably spaced so that the separate spirals do not overlap but are separated only by a small extent to reduce the amount of raverse required to a minimum and to form a package of maximum density so as to contain the maximum material.

It is a further important feature of the invention that the traverse is maintained stationary at each position sufficient to wrap at least one full turn of material at that position so that each helical traverse is locked into the next adjacent spiral by a number of turns. The number of turns may lie between 1 and 5 depending upon the thickness of the tape but cannot be sufficient to form an appreciable step in the package since the tape will be prevented from overcoming the step when traversed in the opposite direction from the other end of the package.

With the foregoing in view, and other advantage as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
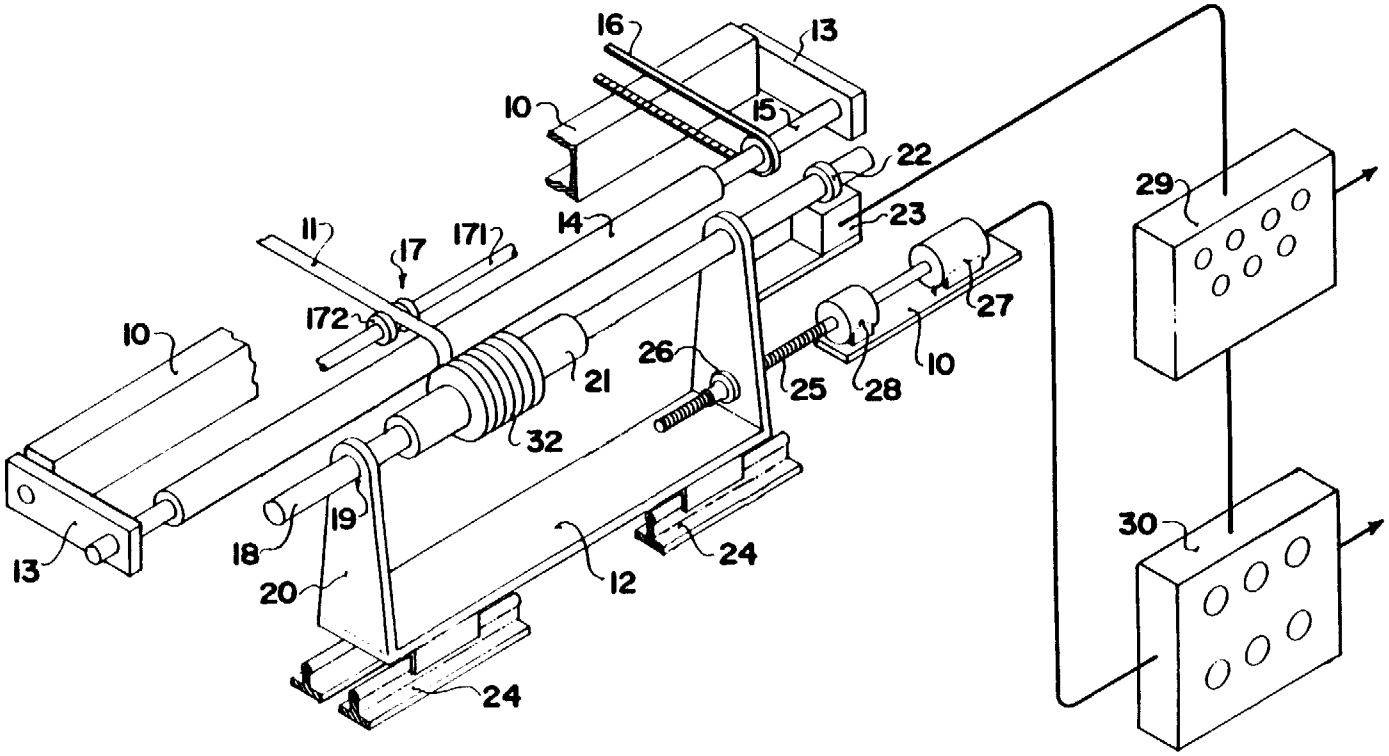
FIG. 1 is a schematic isometric view of a winding apparatus for winding packages according to the invention and including electronic control of the package traverse.

The apparatus for winding tape shown schematically in FIG. 1 incorporates many features of the apparatus disclosed and claimed in co-pending U.S. appln. Ser. No. 071,989 to which reference is made and the disclosure of which is incorporated herein by reference.

The apparatus comprises a main stationary frame 10 which is shown only schematically but supports the drive motors and brackets necessary for the machine. The main frame 10 is of conventional construction and hence is not shown in detail for simplicity of illustration. The main frame 10 provides guides for a tape 11 forwarded from a supply thereof (not shown). The tape 11 is one of a number of such tapes split from a film at an apparatus station upstream of the winding apparatus. A plurality of such tapes may be wound on the apparatus but only one winding station is shown in FIG. 1.

A traversing support frame 12 is provided adjacent the main frame 10 and as explained hereinafter can be traversed transversely to the direction of movement of the tape 11 to traverse the winding position of the tape along a cylindrical core to form a cylindrical package. In practice the traversing carriage 12 will support a number of winding positions so that they are traversed simultaneously to wind the tapes 11 forwarded from the supply.

The main frame 10 carries a pair of pivot arms 13 which in turn support a package drive roller 14 carried on a shaft 15 and driven by a timing belt and pulley 16. The arms 13 are freely pivoted on the main frame 10 so that the roller 14 presses downwardly under its own weight onto a package supported by the traversing carriage 12. A guide 17 comprises a shaft 171 supported on the arms 13 and a pair of collars 172 spaced by the width of the tape so that the tape passes over the shaft 171 between the collars 172 to be guided onto the roller 14 around which it is wrapped so as to maintain a constant position axially of the roller 14. The shaft 171 can support a number of further collars (not shown) to guide further tapes issuing from the supply downwardly to further winding positions (not shown).

The winding position on the traversing carriage 12 comprises a shaft 18 mounted in bearings 19 in upstanding side walls 20 of the carriage 12. In practice each additional winding position (not shown) will include a shaft 18 mounted on the walls 20. A cylindrical core 21 on which the package is to be wound is mounted on the shaft 18 and the shaft 18 includes means (not shown) for releasing the package for replacement by am empty package when filled.

The shaft 18 extends beyond the wall 20 at one end thereof and includes a proximity disc 22 which rotates with the shaft 18. A proximity sensor 23 positioned adjacent the disc 22 and carried on the carriage 12 senses the speed of rotation of the shaft 18 by issuing a pulse for each rotation of the disc 22. The carriage 12 is mounted on anti-friction slides 24 which are conventional in form and it suffice to say that they allow transverse movement of the carriage 12. The carriage is driven in its traverse movement by a lead screw 25 on which a nut 26 is carried and attached to the side wall 20 of the carriage 12. The lead screw 25 is driven by a stepping motor 27 through a suitable gear reducer 28 both of which are mounted upon the main frame 10 again shown schematically. Thus the stepping motor 27 acts to rotate the lead screw 25 by a controlled amount whereby the nut 26 is moved axially of the lead screw to traverse the carriage 12 by a predetermined amount.

Pulses from the proximity sensor 23 are detected by a programmable controller 29 which may be a Potter & Brumfield Series 1000, 1200 or equivalent. Control information issuing from the controller 29 is communicated to the stepping motor 27 via a translator 30 so as to control the stepping motor 27 in dependence upon the condition of the package as sensed by the sensor 23.

Figure 2:
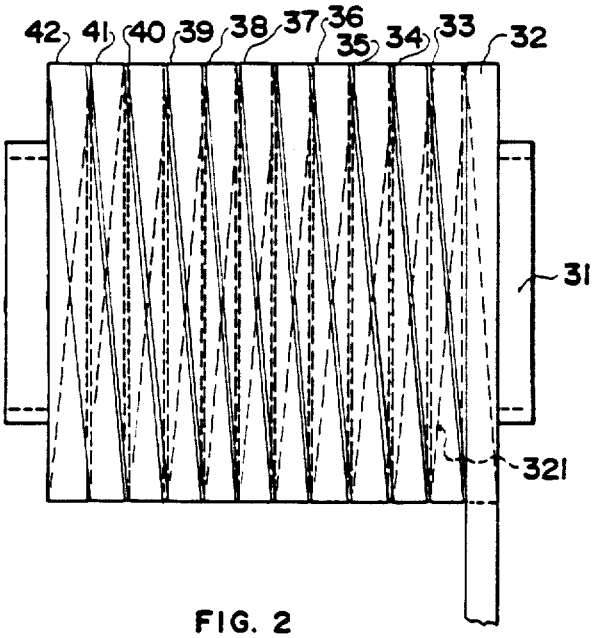
FIG. 2 is a schematic front elevation of a package formed according to the invention.

Turning now to FIG. 2, there is shown a package formed by the apparatus of FIG. 1. The package comprises a core 31 which may be of the conventional type comprising merely a cylindrical body or it may be split axially in one or more locations (not shown) to facilitate removal and replacement on cable manufacturing machinery.

At the start of the operation the tape 11 is attached by conventional means to one end of the core 31 and a number of turns is wound in spiral fashion to form an initial layer at a first position indicated at 32. The number of turns is not fixed but may vary with the type, width and thickness of the tape and it should be understood that these turns overlap one another without any traversing taking place. That is the carriage 12 is maintained stationary during the winding of the initial spiral wraps at the position 32.

After the desired number of units is wound initially on the section 32, the carriage 12 is traversed by the stepping motor 27 rightwardly as shown by an axial distance equal to the width of the tape plus a small predetermined distance for clearance purposes. As the carriage 12 is traversed under the control of the controller 29 the tape flexes slightly to turn from the spiral form to lie at a small angle to the spiral forming a helix until it reaches the position shown at 33. At this position the controller 29 acts to halt the stepping motor 27 whereby the carriage 12 is maintained stationary and the tape is wrapped in spiral manner at the position 33 without any traverse taking place. The helical portion is indicated schematically in dotted line at 321.

This process is repeated through sections 33 to 41 until the initial layers of section 42 are placed and with cross over turn areas or helical portions between each section similar to the helical portion 321. Each of the sections 34 through 41 have the same number of turns as section 33 and substantially half the number of turns applied at the position 32. At the end position 42, the controller 29 acts to wrap twice as many wraps as there are at the intermediate positions 33 through 41 and then acts to reverse the stepping motor 27. The increased number of wraps at the end positions 32 and 42 are provided since it will be appreciated that each cycle of traverse acts to pass the end position only once while passing the intermediate positions twice. The controller 29 then acts to traverse the carriage 12 in intermittent steps across each position 41 through 32 in reverse arrangement to the traverse in the opposite direction so as to wrap spiral sections at each of the positions with a helical traverse section between each.

The controller 29 is pre-programmed in dependence upon the width and thickness of the tape and the desired size of the package. Specifically the number of positions 32 through 42 can be adjusted and in practice this number can lie between 2 and 12 depending upon the end use of the package. In many circumstances the next machine can only receive a relatively small packages whereby packages of two spiral positions can be manufactured with three or four position packages also being possibly used. On machines where size is not a limiting factor, up to twelve or even more spiral positions can be provided.

The spacing between each position and the next is set by the controller 29 such that the spirals of one position do not overlap the spirals at another position but are spaced by a sufficiently small clearance that firstly the package is of a dense construction to contain the maximum material and secondly such that the spacing is less than the width of the tape to prevent tape collapsing into the position between two adjacent sprials.

The number of turns in each spiral at each position is in practice dependent upon the thickness of the tape since if too great a step is formed this may inhibit the traverse of the tape back to that position. In practice the number of turns lies in the range 5 to 1 for tape lying in the range 5/10000th of an inch (0.013 mm) to 2/1000th of an inch (0.05 mm) respectively. The number of turns at each position is in any event greater than one whole turn that is greater than 360° in order to lock the helical portion into the spiral at each position.

The time taken to traverse from one position to the next and hence the helix angle is controlled by the controller 29 such that it is less than the time spent stationary at each position. The time is set so that it is substantially the minimum possible without forming kinks in the tape and this time will vary dependent upon the flexibility of the tape concerned. In practice the traverse takes about one half a turn of the package for tape ¼" wide (6.35 mm) and of the order of one turn of the package for tape of ½" width (12.7 mm).

The controller 29 is dependent upon the speed of rotation of the package and hence the period of time spent at each position in forming spiral turns also is dependent upon the speed of rotation of the package. In this way as the package diameter increases the period of time increases to maintain the number of turns at each position substantially constant throughout the build of the package.

The number of spiral turns at the end positions 32 and 42 is increased relative to that at the intermediate positions so that more than twice the number of turns is wrapped at the end positions. This increase is to compensate for the fact that the amount of material wrapped helically at the end positions is reduced because of the reduced traverses to that position. The number of turns wrapped spirally at the end positions is set to be other than a whole number so that the package is prevented from being exactly symmetrical in its build. In this way patterning whereby one helical layer lies directly on top of the next helical layer is avoided since if this occurs it produces bumps in the package which can seriously deteriorate the package formation.

Figure 3:
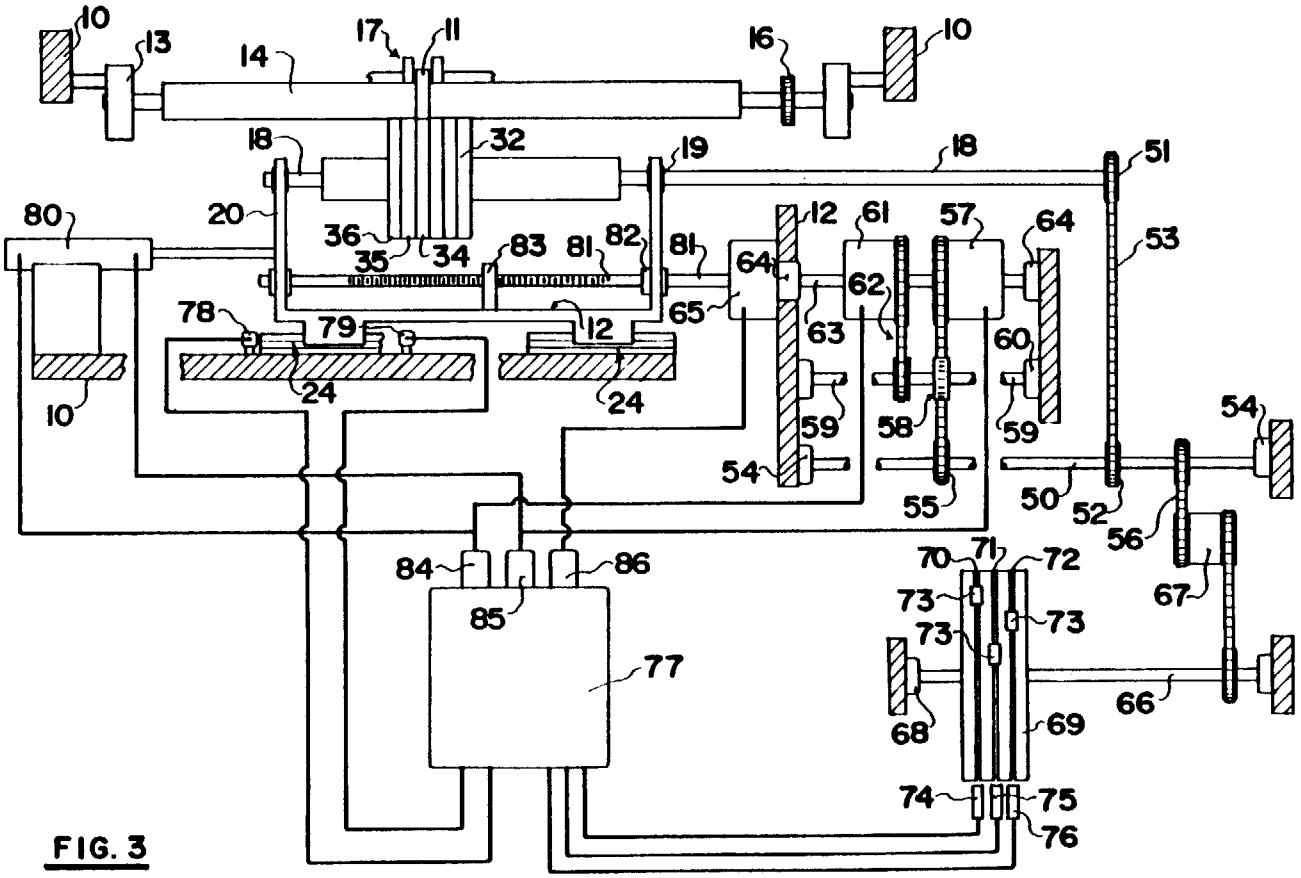
FIG. 3 is a schematic front elevation of a winding apparatus similar to that of FIG. 1 but incorporating electro-mechanical control of the package traverse.

Turning now to FIG. 3 the main frame 10 and carriage 12 are substantially as shown in FIG. 1 with the carriage 12 traversible relative to the guide 17 to move the winding position of the tape 11. In this embodiment control of the traverse movement is effected by an electro-mechanical arrangement carried upon the carriage 12 and schematically indicated in the drawing. Specifically the control mechanism comprises a first countershaft 50 driven from the shaft 18 by a pair of chain wheels 51, 52 and a chain 53 forming a chain drive. It will be appreciated that the chain drive could be replaced in this instance and in any other portion of the figure by a timing belt drive arrangement. The countershaft 50 is mounted in bearings 54 supported on the carriage 12 by a frame structure not shown but of conventional construction which is readily apparent to one skilled in the art.

The countershaft 50 drives a first chain drive arrangement 55 and a second chain drive arrangement 56. The chain drive 55 drives an air clutch 57 and in the reverse direction a chain wheel 58 mounted on a second countershaft 59. Thus the clutch 57 is driven in one direction and the chain wheel 58 in the opposite direction. The shaft 59 is mounted in bearings 60 again carried on the carriage 12 and drives a second air clutch 61 through a further chain drive 62. The clutches 57 and 61 are carried on a shaft 63 mounted in bearings 64 again mounted on the carriage 12. An air brake 65 is also carried on the shaft 63 and is attached to a portion of the carriage 12. It will be appreciated therefore that pneumatic operation of the clutch 57 will act to drive the shaft 63 in one direction; pneumatic operation of the clutch 61 will act to drive the shaft 63 in the opposite direction; and pneumatic operation of the clutch/brake 65 will act to brake the shaft 63. Pneumatic control is arranged such that only one of the clutches 57, 61, 65 is operated at any one time.

The chain drive 56 drives a further drive shaft 66 via a speed reduction gear 67. The shaft 66 is mounted in bearings 68 again supported upon the carriage 12 and the shaft supports a control drum 69. The drum 69 therefore is driven via the shaft 66 and chain drive 56 from the package support shaft 18 at a speed directly proportional thereto. The drum has around its periphery three "T" slots 70, 71, 72 which receive a plurality of dogs 73 which can be adjusted angularly around the drum to desired positions. The dogs 73 cooperate with limit switches 74, 75, 76 provided adjacent the drum cooperating with slots 70, 71, 72 respectively.

The limit switches 74, 75, 76 are connected to a central control device 77. The device 77 also receives input from limit switches 78, 79 supported upon the main frame 10 and adjustable relative thereto to define the end of the traverse of the carriage 12 so that at each end of its traverse the carriage 12 contacts one of the switches 78, 79 to inform the control 77 that it has achieved that position.

Traverse of the carriage 12 is effected by a cylinder/-piston 80 mounted on the main frame 10 with the piston rod attached to the wall 20 of the carriage 12. Air supply to the piston is controlled by the control 77 to respective ends of the cylinder 80 so that expansion and retraction of the piston within the cylinder acts to traverse the carriage 12. The speed and distance of traverse is accurately controlled by a lead screw 81 carried in bearings 82 on the carriage 12 and cooperating with a nut 83 supported on the main frame 10. The lead screw 81 comprises an extension of the shaft 63.

The control device 77 comprises electrical relays and switches and three pneumatic control valves 84, 85, 86 all of which is indicated schematically since it comprises conventional devices arranged in a manner which will be apparent to one skilled in the art from the following description of the function thereof.

In operation during the build of a package with winding of the spiral at the position 34 just complete, a dog 73 in the slot 71 is positioned such that it contacts the limit switch 74 to inform the control device 77. The control device acts to operate the valve 86 to release the brake 65 and to operate the valve 84 which applies air to the cylinder 80 at the left hand end thereof and activates the clutch 61. The cylinder 80 thus applies force to the carriage 12 to move it to the right as shown under control of the lead screw 81 driven by the clutch 61. The amount and speed of movement is therefore accurately controlled by the clutch 61 and thence by the shaft 18 while the motor force is supplied from the cylinder 80. After traversing a distance determined by the position of a dog 73 in the slot 71, the limit switch 75 is activated. The controller 77 then operates the valve 86 to reactivate the brake 65 and the valve 84 to close the pneumatic supply to the cylinder 80 and to the clutch 61 whereby the traversing movement of the carriage 12 is halted. The carriage then remains halted to wind, as explained previously, a spiral of the tape at the position 35.

After a period of time dependent upon the position of a further dog 73 in the slot 70 and the speed of rotation of the drum 69 dependent upon the speed of the shaft 18, the limit switch 74 is again activated to release the brake 65 and to traverse the carriage 12 to the right. The cycle of traversing and halting is continued from one end of the package to the other end as explained previously until the end position is reached whereat the limit switch 79 is activated by the carriage 12. The activation of the limit switch 79 is sensed by the controller 77 and acts to reverse the circuitry whereby the dog 73 in the slots 70 and 71 control in a symmetrical manner to that explained previous the traverse to the left of carriage 12. However, the commencement of the leftward traverse is not commenced until the limit switch 76 is operated by a dog 73 in the slot 69 which controls the number of turns spirally wrapped at the end position 36 in accordance with technical requirements.

As described in relation to FIGS. 1 and 3, the apparatus can be controlled either electronically or electromagnetically. However, these are only examples of a number of different ways in which the control can be provided.

Turning to the details of the drive to the traverse motion of the carriage 12, it will be appreciated that the roller 14 is driven at a rate dependent upon the supply of tape so as to maintain the tape under a constant predetermined tension. The package of tape is driven by frictional contact with the roller 14 which is substantially constant and hence the tension on the tape as it is wound onto the package is substantially constant provided that the load applied to the shaft 28 from the chain drive arrangement 83 is substantially constant.

In order to maintain the load substantially constant and relatively small, the motive force for moving the carriage 12 is completely supplied by the piston/cylinder 80 whereby the lead screw 81 acts to merely control the amount and speed of movement of the carriage 12 substantially without the application of force thereto. For this reason the valves 84, 85 include regulators to control the application of force by the piston/cylinder 80 to the required amount. Thus the load on the shaft 18 is limited to the substantially constantly driven shaft and control drum 69 and does not vary the tension of the tape as it is wound.

In an alternative arrangement, the package can be driven from the centre rather than from contact with its outer surface. In this case a slipping clutch is provided in the drive to allow the package to slow as it increases in diameter while maintaining constant the winding force or tension on the tape.

According to a yet further modification, it is possible to wind two or more tapes on the same core using the principles of the present invention. Generally the tapes will be overlapped as they are fed through the guide 17 and will be wound spirally at a plurality of positions spaced so that one spiral formed from overlapped tapes does not overlap the next adjacent spiral.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

[1. In a method of building a package of tape wound on a core comprising forwarding the tape from a supply thereof, guiding the tape to a winding position on the core, rotating the core to wrap the tape around the core and traversing the winding position across the core to form a package, the improvement wherein the winding position is intermittently traversed to visit repeatedly during the package build each in turn of a plurality of separate positions arranged axially of the core, and at each position is maintained stationary for a period of time to wrap tape spirally of the core in at least one full turn thereof.]

[2. A method according to claim 1 wherein the positions are spaced such that the spiral of tape at each position does not overlap the spiral of tape at the next adjacent position.]

[3. A method according to claim 1 wherein a first of the positions is arranged at one end of the package and a second of the positions is arranged at the other end of the package.]

[4. A method according to claim 1 wherein the period of time at each position is greater than the period of time of traverse of the winding position between each position and the next adjacent position.]

[5. A method according to claim 1 wherein the positions are spaced such that the spiral of tape at each position is spaced from the spiral of tape at the next adjacent position by a distance less than the width of the tape.]

[6. A method according to claim 3 wherein more turns of tape are wrapped at the end positions than at positions intermediate thereto.]

[7. A method according to claim 1 wherein the period of time at each position is increased in dependence upon the package diameter so as to maintain constant the number of turns of tape wrapped spirally at each positions at each visit thereto.]

8. [In an] *An* apparatus for building a package of tape wound on a *circular cylindrical* core, comprising support means [for the] *arranged to support a circular cylindrical* core, drive means for rotating the core to wrap tape therearound, guide means for guiding the tape on to *a winding surface on* the core at a winding position, [and] traverse means for reciprocating one of the guide means and support means relative to the other to traverse the winding position axially of the core to build a package, [the improvement wherein there are provided] *and* traverse control means including means arranged to intermittently advance the traverse means such that the winding position visits each of a plurality of separate positions arranged axially of the core in turn repeatedly during the package build and means for halting the traverse means for a period of time such that the winding position remains at each said position in turn to wrap tape spirally of the core at the position for at least one full turn thereof, *said guide means comprising roller means having a peripheral surface contacting said winding surface at said winding position and means for directing said tape around said peripheral surface to said winding position.*

9. Appartus according to claim 8, wherein the traverse control means includes means for adjusting the distance of advance of the traverse means between each position and the next adjacent position so as to adjust the spacing between the positions.

10. Apparatus according to claim 9, wherein the adjusting means is set such that the positions are spaced whereby the spiral of tape at each position does not overlap the spiral of tape at the next adjacent position.

11. Apparatus according to claim 9, wherein the adjusting means is set such that the positions are spaced whereby the spiral of tape at each position is spaced from the spiral of tape at the next adjacent position by a distance less than the width of the tape.

12. Apparatus according to claim 8, wherein the traverse control means includes means responsive to the speed of rotation of said drive means and for controlling the period of time in dependence thereon.

13. Apparatus according to claim 12, wherein the speed responsive means is arranged whereby the period of time of traverse of the winding position between each position and the next adjacent position is less than the period of time at each position.

14. Apparatus according to claim 12, wherein the traverse control means includes a drum including a plurality of dogs adjustably positioned thereon, means for rotating the drum in dependence upon the speed of the drive means and switching means responsive to contact thereof by respective ones of the dogs for advancing and halting the traverse means.

15. Apparatus according to claim 8, wherein the traverse advance means comprises a lead screw and nut and a stepping motor arranged to rotate the lead screw.

16. Apparatus according to claim 8 wherein the traverse means is arranged such that a first of the positions is at one end of the package and a second of the positions is at the other end of the package.

17. Apparatus according to claim 8, wherein said roller means has a width greater than the width of the tape.

*18. Apparatus according to claim 8, wherein said roller means has a width at least equal to a width of the package so as to contact the package across its full width.*

*19. Apparatus according to claim 8, wherein said drive means is arranged to provide a driving rotation to said roller means such that said peripheral surface of said roller means in contact with said winding surface acts to drive said package.*

*20. Apparatus according to claim 8, wherein said traverse control means is arranged such that the winding position visits each of a pair of separate end positions of the package, and said halting means is arranged such that the winding position remains at said end positions for a period of time sufficient to wrap tape spirally of the core to form a step having at least two turns and of a radial height which is increased relative to another position on the package, and said traverse means is arranged such that the winding position can traverse from said step, to said another position to form a helical traverse portion of the tape which descends from said step to said another position without interfering with the traverse of the tape and such that said helical traverse portions are angularly offset from the next adjacent underlying traverse portion.*

*21. A method of building a package of tape wound on a core comprising forming a right circular cylindrical winding surface having tape wound around an axis thereof while traversing axially relative to said package repeatedly to form a pair of separate axially spaced end positions on the package resulting from repeatedly winding said tape spirally to form a plurality of separate windings of at least two full turns, forming a helical traverse disposed between each separate spiral winding to connect the spiral winding to another position on said package such that each spiral winding forms a right circular cylindrical step at a respective one of the end positions of increased radial height relative to the radial height of said another position which has not been increased, and wrapping further wraps of tape at said another position to build the radial height thereof up to said step, wherein each helical traverse from said end position to said another position is arranged such that it is angularly spaced from the preceding underlying helical traverse from said end positions to said another position and the height of each step being such that substantial deformation of the tape and interference with said traverse are avoided as the tape descends from said step and such that the helical traverses are sufficiently frequent to interlock said end position with said another position at spaced locations throughout its radial and angular dimension to provide the package with stability and resistance to telescoping or collapse.*

*22. A method according to claim 21 wherein said helical traverse includes one full turn.*

*23. A method according to claim 21 wherein the number of turns in each spiral winding lies in the range 2 to 10.*

*24. A method according to claim 21 wherein the number of turns in each end position between each helical traverse section and the preceding underlying helical traverse section is different from an integral number of turns whereby said each helical traverse section is angularly spaced from said preceding underlying helical traverse section.*

*25. A method of building a package of tape wound on a core comprising forming a right circular cylindrical winding surface in which the tape is wound around an axis thereof while traversing axially relative to said package repeatedly to form a pair of separate axially spaced end positions on the package of tape by repeatedly winding said tape to form a plurality of separate spiral windings having a number of turns lying between at least 2 and about 10, forming a helical traverse in between each spiral winding of said tape to connect the spiral winding to another position on said package such that each spiral winding forms a circular cylindrical step at a respective one of the end positions of increased radial height relative to the radial height of said another position which has not been increased, wherein each said helical traverse from each said end position to said another position is angularly spaced from the preceding underlying helical traverse from said end position to said another position whereby said helical traverses interlock each said end position with said another position throughout its radial and angular dimension to provide the package with stability and resistance to collapse.*

*26. A method according to claim 25 wherein each helical traverse section from said end position to said another position is arranged such that it includes one full turn.*

*27. A method according to claim 25 wherein the number of turns in each end position between each helical traverse section and the preceding underlying helical traverse section is different from an integral number of turns whereby*

*said each helical traverse section is angularly spaced from said preceding underlying helical traverse section.*

*28. A method of building a package of tape comprising forming a package body defining a right circular cylindrical winding surface substantially from a plurality of axially spaced right circular cylindrical body portions, each portion being coaxial and including a plurality of turns of said tape which are spirally wrapped so that the edges of the turns of tape of the portion lie in the same pair of radial planes spaced axially on said package body, interconnecting each portion to another of said portions at repeated positions throughout a radial dimension of said portion by helically wrapped traverse sections of tape which axially traverse said package from said portion to another said portion in such a manner that, as the tape traverses from said portion to said another portion, it descends from a radial location on said portion to a radial location on said another portion of reduced radial height, adding at said another portion further wraps of tape to build a step formed from said tape to a radial height substantially equal to said radial location on said portion, the number of turns of spirally wrapped tape in said step lying in the range of at least 1 to about 5 and angularly spacing each helically wrapped traverse section from said portion to said another portion from the preceding underlying helically wrapped traverse section from said portion to said another portion whereby the portions are interlocked by said traverse sections.*

*29. A method according to claim 28 wherein each helical traverse section includes one full turn.*

*30. A method according to claim 28 wherein two of said portions are end portions arranged at respective ends of said package and wherein the number of turns in each end portion between each helical traverse section and the next adjacent underlying helical traverse section is different from an integral number of turns whereby said each helical traverse section is angularly spaced from said next adjacent underyling helical traverse section.*

*31. A method of building a package of tape comprising forming a package body defining a right circular cylindrical winding surface substantially from a plurality of axially spaced right circular cylindrical body portions, each portion being coaxial and including a plurality of turns of said tape which are spirally wrapped so that the edges of the turns of tape of the portion lie in the same pair of radial planes spaced axially on said package body, interconnecting each portion to another of said portions at repeated positions throughout a radial dimension of said portion by helically wrapped traverse sections of tape which axially traverse said package from said portion to another said portion so that each portion is divided by said helically wrapped traverse sections into a plurality of concentric steps of spirally wrapped tape, whereby as said tape traverses from said portion to another portion, it descends by the height of one step, arranging each helically wrapped traverse section from each said portion to said another portion such that it is angularly spaced from the preceding underlying helically wrapped traverse section from said portion to said another portion and arranging the number of turns of spirally wrapped tape in said step to avoid interfering with the traverse of tape and deformation of the tape and such that the helically wrapped traverse sections are sufficiently frequent to interlock each said portion with said another portion throughout its radial and angular dimension to provide a package resistant to telescoping and collapse.*

*32. A method according to claim 31 wherein the number of turns of spirally wrapped tape in each step lies in the range of at least one to about five.*

*33. A method according to claim 31 wherein each helical traverse section includes one full turn of tape whereby the portions are interlocked throughout their radial dimensions by said traverse sections.*

*34. A method according to claim 31 wherein two of said portions are end portions arranged at respective ends of said package and wherein the number of turns in each end portion between each helical traverse section and the next adjacent underlying helical traverse section is different from an integral number of turns whereby said each helical traverse section is angularly spaced from said next adjacent underlying helical traverse section.*

*35. A method of building a package of tape comprising forming a right circular cylindrical winding surface by wrapping the tape around an axis thereof while traversing axially relative to the package repeatedly to form a pair of separate axially spaced end positions of the package of tape by repeatedly winding said tape spirally to form a plurality of separate spiral windings of a least two full turns, and disposing a helical traverse between each separate spiral winding to connect the spiral winding to another position on said package so that each spiral winding forms a right circular cylindrical step at a respective one of the end positions of increased radial height relative to the radial height of said another position which has not been increased, adding at said another position further wraps of tape to build the radial height thereof up to that of the step, angularly dispersing said helical traverses from each said end position to said another position around the angular dimension of the end position and arranging the height of each step together with the position and angle of the helical traverse so as to avoid kinks in the tape as it descends in said helical traverse from the step whereby to provide the package with stability and resistance to telescoping or collapse.*

*36. A method of building a package of tape comprising forming a body of tape defining a circular cylindrical inner surface arranged for support by a core and a circular cylindrical winding surface substantially from a plurality of circular cylindrical axially spaced body portions, each portion being coaxial and including a plurality of turns of tape which are spirally wrapped so that the edges of the turns of tape of the portion lie in the same pair of radial planes spaced axially of the package, and interlocking each portion to another of said portions at repeated positions throughout a radial dimension of said portion by helically wrapped sections of tape which traverse axially the package from said portion to said another portion whereby said package is interlocked to provide stability.*

*37. A method of building a package of tape comprising forming a body of tape defining a circular cylindrical inner surface arranged for support by a core and a circular cylindrical winding surface substantially from a plurality of circular cylindrical axially spaced body portions, each portion being coaxial and including a plurality of turns of tape which are spirally wrapped so that the edges of the turns of tape of the portion lie in the same pair of radial planes spaced axially of the package, interlocking each portion to another of said portions at repeated positions throughout a radial dimension of said portion by helically wrapped sections of tape which traverse axially of the package from said portion to said another portion, and angularly dispersing said helical traverse sections from said portion to said another portion around the angular dimension of said portion whereby said package is interlocked in its radial and angular dimensions to provide stability.*

* * * * *